(12) United States Patent
Batra et al.

(10) Patent No.: US 7,532,565 B2
(45) Date of Patent: May 12, 2009

(54) MAPPING DATA TONES ONTO GUARD TONES FOR A MULTI-BAND OFDM SYSTEM

(75) Inventors: Anuj Batra, Dallas, TX (US); Jaiganesh Balakrishnan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 631 days.

(21) Appl. No.: 11/021,053

(22) Filed: Dec. 22, 2004

(65) Prior Publication Data

US 2005/0265221 A1 Dec. 1, 2005

Related U.S. Application Data

(60) Provisional application No. 60/568,940, filed on May 7, 2004.

(51) Int. Cl.
*H04J 11/00* (2006.01)

(52) U.S. Cl. ....................................... 370/208

(58) Field of Classification Search ................ 370/203, 370/208–210
See application file for complete search history.

(56) References Cited

U.S. PATENT DOCUMENTS

| | | | |
|---|---|---|---|
| 5,867,478 A * | 2/1999 | Baum et al. ................. | 370/203 |
| 6,771,591 B1 | 8/2004 | Belotserkovsky et al. | |
| 6,876,675 B1 * | 4/2005 | Jones et al. ................. | 370/509 |
| 7,020,069 B1 * | 3/2006 | Pollack et al. .............. | 370/203 |
| 7,218,948 B2 * | 5/2007 | Laroia et al. ................ | 455/522 |
| 2002/0188908 A1 | 12/2002 | Yonge, III et al. | |
| 2003/0090994 A1 * | 5/2003 | Kakura ........................ | 370/208 |

* cited by examiner

*Primary Examiner*—Ricky Ngo
*Assistant Examiner*—Dady Chery
(74) *Attorney, Agent, or Firm*—Steven A. Shaw; W. James Brady; Frederick J. Telecky, Jr.

(57) ABSTRACT

A device (104, 106, 108) is provided for wireless communication. The device (104, 106, 108) includes a transmitter (200) operable to transmit an orthogonal frequency division multiplex symbol. The orthogonal frequency division multiplex symbol has a first set of copied tones adjacent a first end of the orthogonal frequency division multiplex symbol, a second set of copied tones adjacent a second end of the orthogonal frequency division multiplex symbol, and a plurality of data tones provided between the first and second sets of copied tones. The first and second sets of copied tones include copies of at least some of the plurality of data tones.

18 Claims, 4 Drawing Sheets

MAPPING DATA TONES ONTO GUARD TONES FOR A MULTI-BAND OFDM SYSTEM

CROSS-REFERENCE TO RELATED APPLICATIONS

This application claims priority to U.S. Provisional Application No. 60/568,940 filed May 7, 2004, and entitled "Mapping Data Tones Onto Guard Tones for a Multi-band OFDM System," by Anuj Batra et al, incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a method for mapping data tones onto guard tones for an orthogonal frequency division multiplex system.

BACKGROUND OF THE INVENTION

A network provides for communication among members of the network. Wireless networks allow connectionless communications. Wireless local area networks are generally tailored for use by computers and may employ sophisticated protocols to promote communications. Wireless personal area networks with ranges of about 10 meters are poised for growth, and increasing engineering development effort is committed to developing protocols supporting wireless personal area networks.

With limited range, wireless personal area networks may have fewer members and require less power than wireless local area networks. The IEEE (Institute of Electrical and Electronics Engineers) is developing the IEEE 802.15.3a wireless personal area network standard. The term piconet refers to a wireless personal area network having an ad hoc topology comprising communicating devices. The piconet may be coordinated by a piconet coordinator (PNC). Piconets may form, reform, and abate spontaneously as various wireless devices enter and leave each other's proximity. Piconets may be characterized by their limited temporal and spatial extent. Physically adjacent wireless devices may group themselves into multiple piconets running simultaneously.

One proposal to the IEEE 802.15.3a task group divides the 7.5 GHz ultra wide band (UWB) bandwidth from 3.1 GHz to 10.6 GHz into fourteen bands, where each band is 528 MHz wide. These fourteen bands are organized into four band groups each having three 528 MHz bands and one band group of two 528 MHz bands. An example piconet may transmit a first multi-band orthogonal frequency division multiplex (MB-OFDM) symbol in a first 312.5 nS duration time interval in a first frequency band of a band group, a second MB-OFDM symbol in a second 312.5 nS duration time interval in a second frequency band of the band group, and a third MB-OFDM symbol in a third 312.5 nS duration time interval in a third frequency band of the band group. Other piconets may also transmit concurrently using the same band group, discriminating themselves by using different time-frequency codes and a distinguishing preamble sequence. This method of piconets sharing a band group by transmitting on each of the three 528 MHz wide frequencies of the band group may be referred to as time frequency coding or time frequency interleaving (TFI). Alternately, piconets may transmit exclusively on one frequency band of the band group which may be referred to as fixed frequency interleaving (FFI). Piconets employing fixed frequency interleaving may distinguish themselves from other piconets employing time frequency interleaving by using a distinguishing preamble sequence. In practice four distinct preamble sequences may be allocated for time frequency interleaving identification purposes and one distinct preamble sequence has been allocated for fixed frequency interleaving. In different piconets different time-frequency codes may be used. In addition, different piconets may use different preamble sequences.

The structure of a message package according to the Multi-band OFDM SIG physical layer specification comprises a preamble field, a header field, and a payload field. The preamble field may contain multiple instances of the distinct preamble sequence. The preamble field may be subdivided into a packet and frame detection sequence and a channel estimation sequence. The channel estimation sequence is a known sequence that may be used by a receiver to estimate the characteristics of the wireless communication channel to effectively compensate for adverse channel conditions. The preamble field, the header field, and the payload field may each be subdivided into a plurality of OFDM symbols.

SUMMARY OF THE INVENTION

According to one embodiment, a device is provided for wireless communication. The device includes a transmitter operable to transmit an orthogonal frequency division multiplex symbol. The orthogonal frequency division multiplex symbol has a first set of copied tones adjacent a first end of the orthogonal frequency division multiplex symbol, a second set of copied tones adjacent a second end of the orthogonal frequency division multiplex symbol, and a plurality of data tones provided between the first and second sets of copied tones. The first and second sets of copied tones include copies of at least some of the plurality of data tones.

In another embodiment, a device for wireless orthogonal frequency division multiplex symbol communication is provided. The device includes a transceiver operable to map at least some data tones of an orthogonal frequency division multiplex symbol onto guard tones of the orthogonal frequency division multiplex symbol. The guard tones are provided on adjacent ends of the data tones of the orthogonal frequency division multiplex symbol.

In one embodiment, a method of wireless communication is provided. The method includes generating an orthogonal frequency division multiplex symbol having a first set of guard bins adjacent a first end of the orthogonal frequency division multiplex symbol, a second set of guard bins adjacent a second end of the orthogonal frequency division multiplex symbol, and a plurality of data bins for maintaining data provided between the first and second sets of guard bins. The method includes duplicating data such that the first and second sets of guard bins maintain copies of at least some of the same data provided in the plurality of data bins.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The present disclosure teaches an appropriation of orthogonal frequency division multiplex symbol frequency bins previously allocated as guard tones for duplicating a portion of the data bins. In an embodiment, the data bins selected for duplicating or mapping onto the frequency bins previously allocated as guard tones are those nearest the two frequency extremes of the orthogonal frequency division multiplex symbol and hence most subject to adjacent channel interference or attenuation near the edges of the passband due to low order or low cost of the filter. The duplication of the data bins boosts the signal to noise ratio of these data bins, improving reception of the orthogonal frequency division multiplex symbol.

Figure 1:
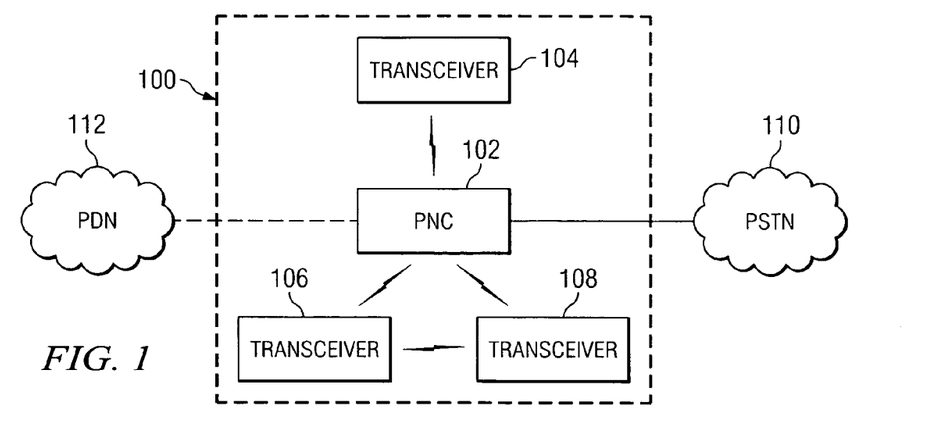
FIG. 1 depicts an exemplary wireless piconet for implementing the embodiments of the disclosure.

Turning now to FIG. 1, a block diagram depicts a piconet 100 formed by a number of cooperating electronic devices. A first transceiver 102 operates as the piconet controller for the piconet 100. A second transceiver 104, a third transceiver 106, and a fourth transceiver 108 operate as member of the piconet 100. The transceivers 102, 104, 106, and/or 108 may also be capable of operating as the piconet controller of the piconet 100, but are not depicted as carrying out that role. The first transceiver 102 may broadcast beacon messages, which may be referred to simply as beacons, to promote communication among the members of the piconet 100. The effective range of the beacon messages, and hence the effective boundary of the piconet 100, is depicted by a dashed line in FIG. 1. The first transceiver 102 may be connected to either a public switched telephone network 110 or to a public switched data network 112 whereby the members of the piconet 100, for example the transceivers 102, 104, 106, and 108, may communicate with the Internet or other network of interconnected communication devices. The transceivers 102, 104, 106, and 108 may wirelessly communicate according to the IEEE 802.15.3a wireless personal area network protocol. The wireless communications within the piconet 100 are transmitted and received as a sequence of orthogonal frequency division multiplex (OFDM) symbols.

Figure 2:
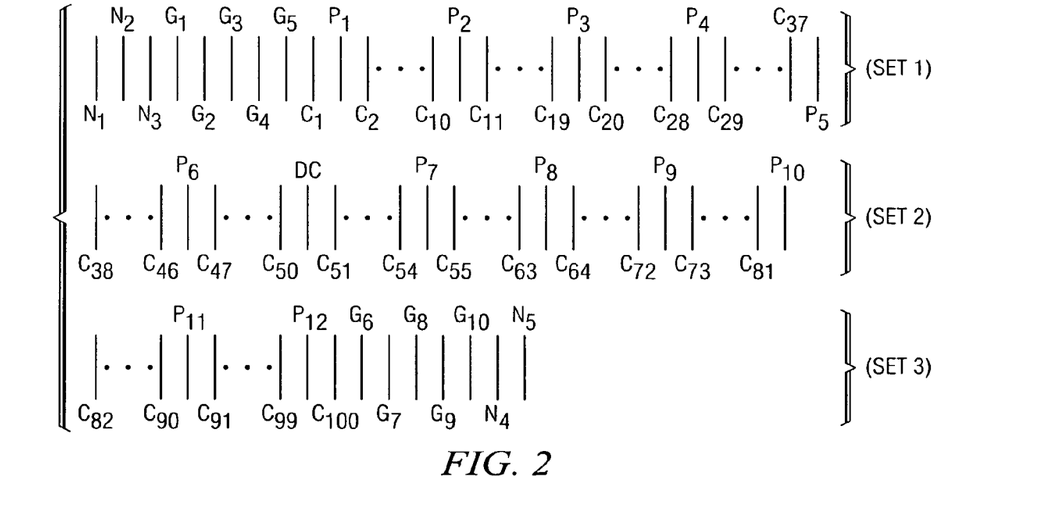
FIG. 2 depicts an exemplary set of frequency bins or carrier frequencies of an orthogonal frequency division multiplex message format.

Turning now to FIG. 2, an exemplary set of frequency ranges, referred to as frequency bins, suitable for generating OFDM symbols for communication in the piconet 100 is depicted. Each frequency bin may be referred to as a tone. The complete set of frequency bins is formed by joining the frequency bins in each of the three sets illustrated in FIG. 2, set 1, set 2, and set 3. The set 1 frequency bins precede in frequency the set 2 frequency bins, and the set 2 frequency bins precede in frequency the set 3 frequency bins. The frequency bins include five null tones labeled $n_1$ through $n_5$, ten guard tones labeled $g_1$ through $g_{10}$, twelve pilot tones labeled $p_1$ through $p_{12}$, one direct current tone labeled DC, and one hundred data tones labeled $c_1$ through $c_{100}$.

The pilot tones contain known values and are provided to promote the coherent demodulation of the OFDM symbols. The null tones contain zero values and are provided to provide a frequency buffer between 528 MHz frequency bands and to reduce DC offset problems. The guard tones contain non-data non-zero values to provide further frequency buffer between 528 MHz frequency bands. The data tones contain the information content of communication packets—the content of preambles, headers, or data fields. The data tones may encode multiple bits of information according to various modulation schemes, for example quadrature phase shift keying (QPSK).

Figure 3:
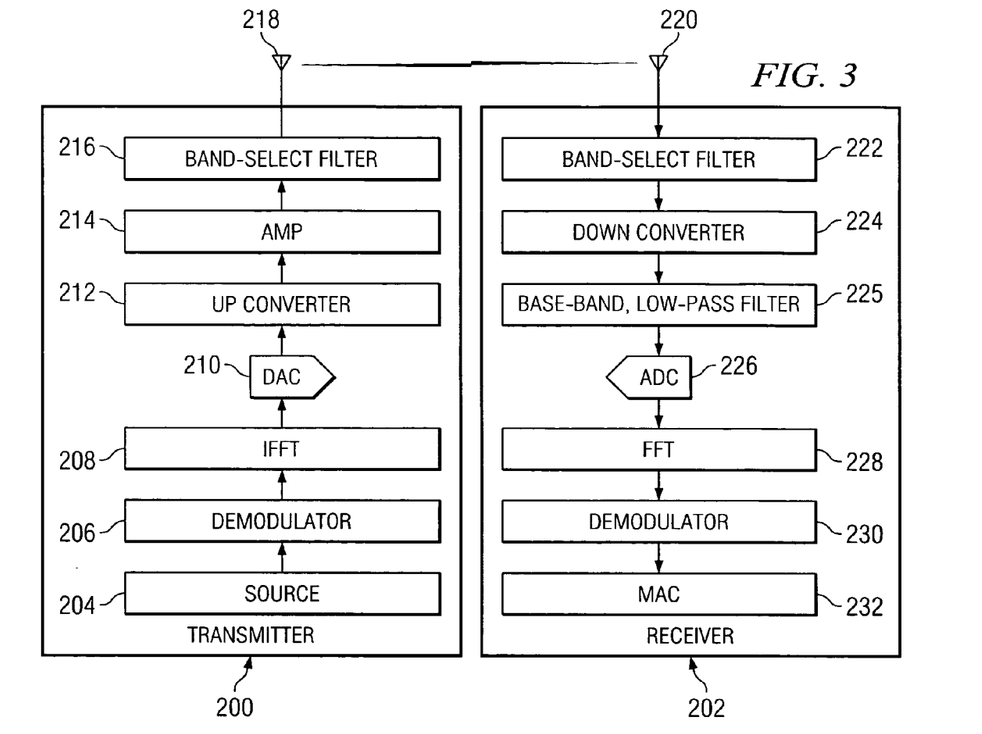
FIG. 3 is a block diagram of a transmitter in communication with a receiver according to an embodiment of the disclosure.

Turning now to FIG. 3, a wireless transmitter 200 is shown in communication with a wireless receiver 202. The wireless transmitter 200 is suitable for transmitting OFDM symbols formatted according to embodiments of the present disclosure, and the wireless receiver 202 is suitable for receiving the OFDM symbols formatted according to embodiments of the present disclosure. A signal source 204 provides data to be transmitted to a modulator 206. The modulator 206 segments the data according to the plurality of data tones and encodes the value of each data tone according to an appropriate modulation technique. The modulator 206 also encodes values for the guard tones and pilot tones. The modulator 206 provides the tones to an inverse fast Fourier transformer component 208 which translates the frequency domain representation of the data into a time domain representation of the same data.

The inverse fast Fourier transformer component 208 provides the time domain representation of the signal to a digital-to-analog converter 210 which converts the digital representation of the signal to an analog form. The analog form of the signal is a 528 MHz wide baseband signal. The digital-to-analog converter 210 provides the 528 MHz wide baseband signal to an up converter 212 which frequency shifts the 528 MHz wide baseband signal to the appropriate frequency band for transmission. The up converter 212 provides the up converted 528 MHz wide signal to an amplifier 214 which boosts the signal strength for wireless transmission. The amplifier 214 feeds the up converted, amplified, 528 MHz wide signal to a band-select filter 216, typically having a bandwidth of 1584 MHz, that attenuates any spurious frequency content of the up converted signal which lies outside the desirable three bands of the MB-OFDM signal. The band-select filter 216 feeds a transmitting antenna 218 which wirelessly transmits the up converted, amplified, band-select filtered 528 MHz wide signal.

The wireless signal is received by a receiving antenna 220. The receiving antenna 220 feeds the signal to a receiving band-select filter 222, typically having a bandwidth of 1584 MHz, that selects all three bands of the MB-OFDM signal from the entire bandwidth which the receiving antenna 220 is capable of receiving. The receiving band-select filter 222 feeds the selected MB-OFDM signal to a down converter 224 which frequency shifts the MB-OFDM signal to a 528 MHz baseband signal. The down converter 224 feeds the 528 MHz baseband signal to a base-band, low-pass filter 225, typically having a 528 MHz bandwidth. The base-band, low-pass filter 225 feeds the filtered 528 MHz baseband signal to an analog to digital converter 226 which digitizes the filtered 528 MHz baseband signal. The analog to digital converter 226 feeds the digitized 528 MHz baseband signal to a fast Fourier transformer 228 which converts the digitized 528 MHz baseband signal from the time domain to the frequency domain, decomposing the digitized 528 MHz baseband signal into the 128 distinct tones including 100 data tones, 12 pilot tones, 10 guard tones, 5 null tones, and 1 direct current tone. The fast Fourier transformer 228 feeds the frequency domain tones to a demodulator component 230 which demodulates the 100 data tones into a stream of data. The demodulator component 230 uses the information contained in the 12 pilot tones and the 10 guard tones to recover the information content from the 100 data tones. The demodulator component 230 provides the stream of data to a medium access control (MAC) component 232 which interprets and uses the stream of data.

The wireless transmitter 200 and wireless receiver 202 structures described above may be combined in some embodiments in a single device referred to as a transceiver, for example the transceivers 102, 104, 106, and 108 described above with reference to FIG. 1. While the transmitting bandpass filter 216 and the amplifier 214 are described as separate components, in some embodiments these functions may be integrated in a single component. Additionally, in some embodiments the up converted 528 MHz bandwidth signal may be bandpass filtered by the transmitting bandpass filter 216 before it is amplified by the amplifier 214. Other systems, components, and techniques may be implemented for these purposes which will readily suggest themselves to one skilled in the art and are all within the spirit and scope of the present disclosure.

Figure 4A:
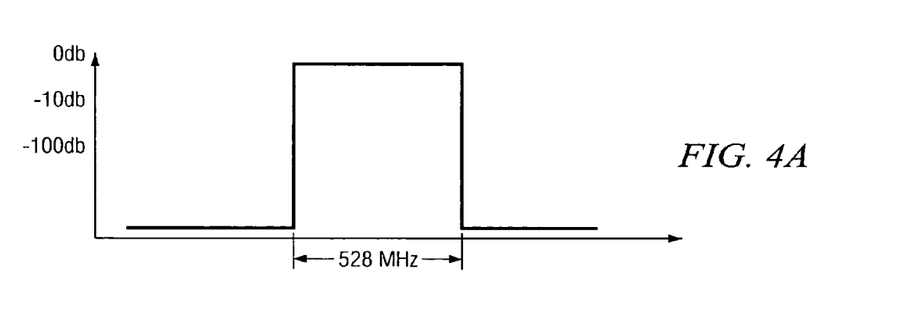
FIG. 4A depicts the frequency response of an ideal baseband, low-pass filter.

Turning now to FIG. 4A, the frequency response of an ideal base-band, low-pass filter having a bandwidth of 528 MHz is depicted. Within the 528 MHz wide passband the filter provides no attenuation. Immediately outside of the 528 MHz wide passband the filter provides intense attenuation.

Figure 4B:
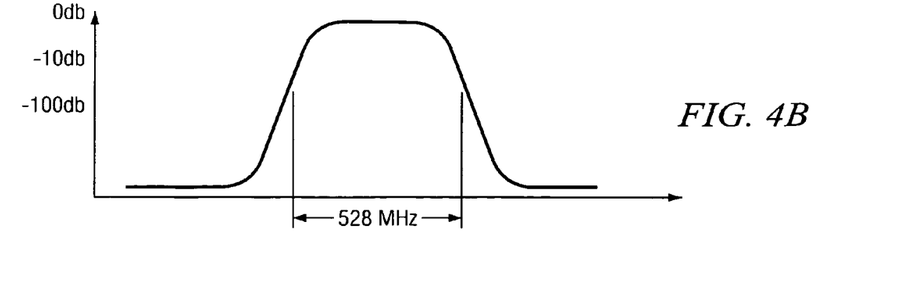
FIG. 4B depicts an exemplary frequency response of a practical base-band, low-pass filter for implementing the embodiments of the disclosure.

Turning now to FIG. 4B, the frequency response of a physically realizable base-band, low-pass filter having a bandwidth of approximately 528 MHz wide is depicted. Within the central range of the 528 MHz bandwidth, the base-band, low-pass filter provides essentially no attenuation. Well outside the 528 MHz bandwidth, the base-band, low-pass filter provides intense attenuation. Unlike the ideal base-band, low-pass filter, however, a transition zone exists on both sides of the bandwidth where the base-band, low-pass filter provides intermediate and incomplete attenuation. The rate at which the filter transitions from no attenuation to intense attenuation may be, for example, a function of the complexity and perhaps the cost of the filter. The complexity of the filter may be associated with the order of the filter: a higher order filter being a more complex filter, a lower order filter being a less complex filter. Achieving a steeper or more rapid transition or filter roll-off may, for example, require greater filter circuit complexity.

Referring back to FIG. 2, the ten guard tones, five guard tones at either end of the 528 MHz bandwidth of the OFDM symbol, may fall within the attenuation transition zone of the band-select filter 216 and/or the base-band, low-pass filter 225. Further, the first few data tones and the last few data tones may also be within the attenuation transition zone of the band-select filter 216 and/or the base-band, low-pass filter 225, hence reducing the signal to noise ratio of the first few data tones and the last few data tones.

Figure 5A:
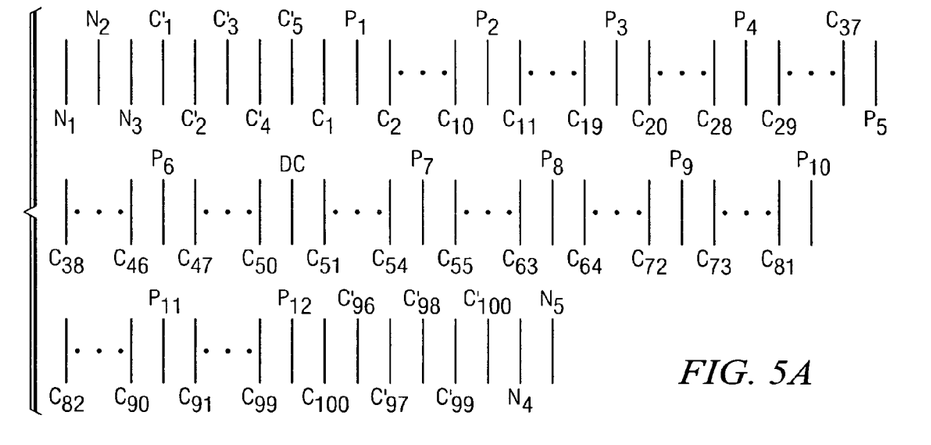
FIG. 5A depicts an exemplary set of frequency bins or carrier frequencies of another orthogonal frequency division multiplex message format.

Turning now to FIG. 5A, an alternative exemplary set of frequency ranges is depicted. The data tones $C_1$ through $C_5$ and $C_{96}$ through $C_{100}$ are copied onto the frequency bins allocated for guard tones in FIG. 2. Thus, $C'_1$ is a copy of $C_1$, $C'_2$ is a copy of $C_2$, and so on, and $C'_{100}$ is a copy of $C_{100}$. The $C'_n$ tones may be referred to as copy tones or mapped tones. When the receiver demodulates the OFDM symbol transmitted according to the set of frequency ranges illustrated in FIG. 5A, the demodulator 230 combines $C'_1$ with $C_1$, $C'_2$ with $C_2$, and so on, and $C'_{100}$ with $C_{100}$, for example using a maximal ratio combining technique, an equal gain combining technique, or other techniques. This technique may increase the signal to noise ratio of the data tones $C_1$ through $C_5$ and $C_{96}$ through $C_{100}$ at a receiver.

Figure 5B:
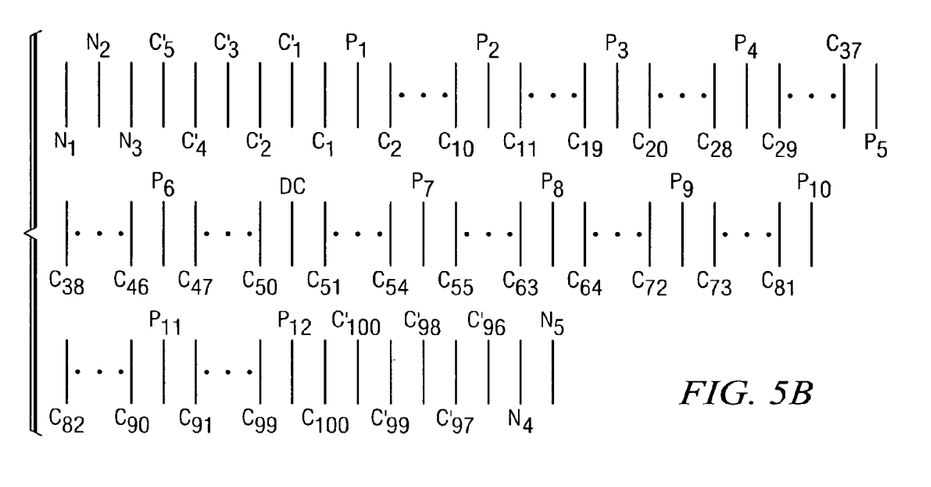
FIG. 5B depicts an exemplary set of frequency bins or carrier frequencies of another orthogonal frequency division multiplex message format.

Turning now to FIG. 5B, an alternative exemplary set of frequency ranges is depicted. The difference between the set of frequency ranges depicted in FIG. 5A and the set of frequency ranges depicted in FIG. 5B is that the frequency bins closer to the center of the 528 MHz bandwidth, and hence less subject to filter attenuation and interference, are copied to the frequency bins closer to the outer edge of the 528 MHz bandwidth. This technique may increase the signal to noise ratio of the data tones $C_1$ through $C_5$ and $C_{96}$ through $C_{100}$ and, because the greatest risk of adjacent channel interference and filter attenuation may generally be at the edges of the frequency ranges. This system provides proportionally more protection for the more vulnerable data tones, for example $C_1$ and $C_{100}$.

Figure 5C:
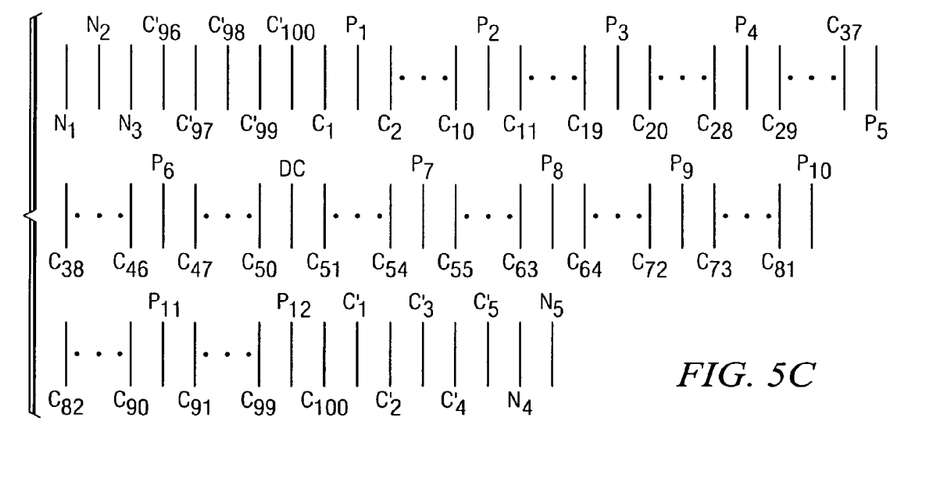
FIG. 5C depicts an exemplary set of frequency bins or carrier frequencies of another orthogonal frequency division multiplex message format.

Turning now to FIG. 5C, an alternative exemplary set of frequency ranges is depicted. The difference between the set of frequency ranges depicted in FIG. 5A and the set of frequency ranges depicted in FIG. 5C is that the frequency bins at the low end of the 528 MHz bandwidth are copied at the high end of the 528 MHz bandwidth and the frequency bins at the high end of the 528 MHz bandwidth are copied at the low end of the 528 MHz bandwidth. If a strong interference affects one extreme or the other of the 528 MHz bandwidth, copying frequency bins located at this edge to a nearby frequency bin may not provide much relief from the strong interference whereas copying to the opposite end of the 528 MHz bandwidth, which may be free of the strong interference, may prove more effective.

Figure 5D:
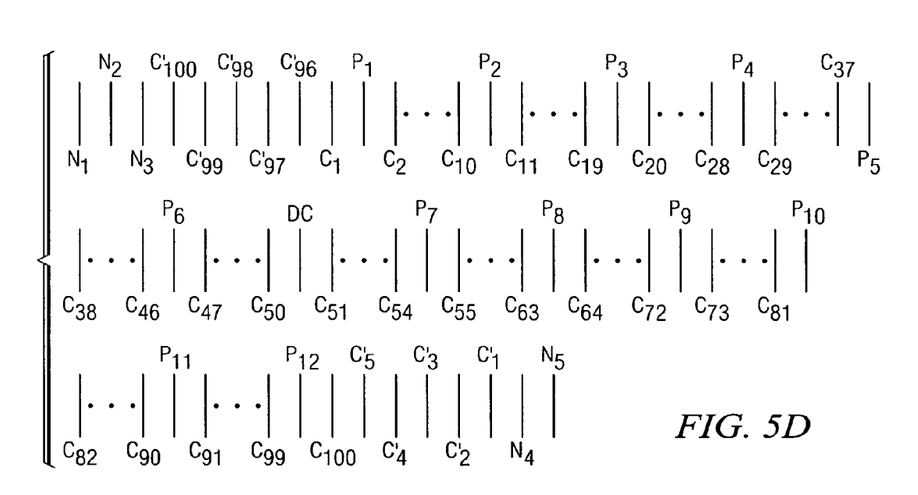
FIG. 5D depicts an exemplary set of frequency bins or carrier frequencies of another orthogonal frequency division multiplex message format.

Turning now to FIG. 5D, an alternative exemplary set of frequency ranges is depicted. The difference between the set of frequency ranges depicted in FIG. 5C and the set of frequency ranges depicted in FIG. 5D is that the order of the copied frequency bins is reversed, which may provide an advantage in some embodiments.

Note that the ten data tones, $C_1$ through $C_5$ and $C_{96}$ through $C_{100}$, are located nearest the two extremes of the 528 MHz bandwidth of the OFDM symbol and hence are most subject to filter attenuation and/or adjacent channel interference. The copying of data tones may increase the signal-to-noise ratio (SNR) of the signal processed by the receiver 202 which promotes communication in noisy environments or alternatively promotes higher data transmission rates. Additionally, copying these ten data tones provides frequency diversity for these ten data tones, making them less subject to an arbitrary channel null or interference spike. Copying the ten data tones boosts the useful transmitted energy relative to the frequency bin configuration depicted in FIGS. 2A, 2B, and 2C, thus using the 528 MHz bandwidth more effectively. Copying the ten data tones enables the requirements on the bandpass filter 216 to be relaxed, which may, for example, reduce the complexity and cost of manufacturing or purchasing the transceivers 202, 204, 206, and 208. Other configurations of the frequency ranges are contemplated by the present disclosure. Additionally, an embodiment may copy a single data tone onto multiple guard tones. It will be readily appreciated that the embodiment mapping data tones onto ten guard tones disclosed above can be easily extended to any number of guard tones, either fewer than ten guard tones or more than ten guard tones.

In some embodiments, the copied tones, for example $C'_1$ through $C'_5$ and $C'_{96}$ through $C'_{100}$, may be scaled to an amplitude different than the data tones they are copied from, for example $C_1$ through $C_5$ and $C_{96}$ through $C_{100}$, by multiplying through by a coefficient which is a positive number. In some embodiments, the copied tones may all be scaled using the same constant of proportionality. In other embodiments, the constant of proportionality may vary with the position of the copied tones so as to provide a ramping or transition zone between the null tones and the data tones. Appropriate scaling can be readily defined for alternate configurations of the copied frequency bins. The scaling may be tuned to the capabilities of the bandpass filter 216. For example, if a very high quality bandpass filter 216 with a short transition zone is employed by the transmitter 200, the data tones maybe copied at full amplitude and transmitted with unity power. If a lower quality bandpass filter 216 with a broader transition zone is employed by the transmitter, the data tones may be increasingly scaled, either rolling off the amplitude or boosting the amplitude, as the edge of the 528 MHz bandwidth is approached. If other than unity scaling is employed, an identical scaling or power envelope should be applied to the channel estimation sequence of the preamble of the packet so that the receiver may properly adjust to receive the scaled data tones.

The transceivers 102, 104, 106, and 108 described above may be implemented in various ways, including on a single integrated circuit or on a plurality of integrated circuits coupled together such as is well known to those skilled in the art. In one embodiment the transceivers 102, 104, 106, and 108 are implemented as a printed circuit card.

Figure 6:
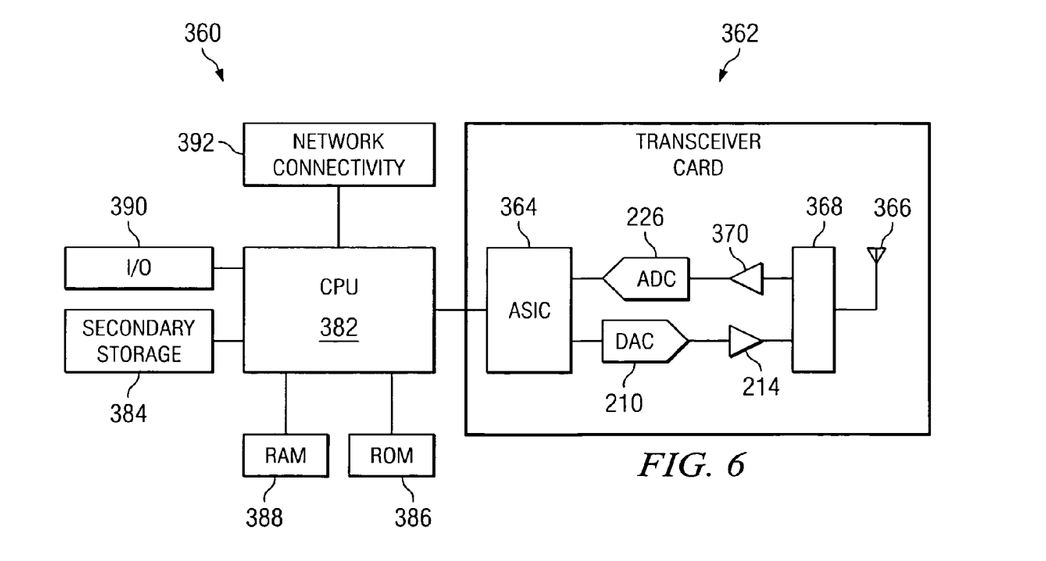
FIG. 6 an exemplary general purpose computer system having a radio transceiver card suitable for implementing the several embodiments of the disclosure.

Turning now to FIG. 6, a system 360 illustrates an exemplary piconet member device. A transceiver card 362 comprises an application specific integrated circuit (ASIC) 364 or other form of digital processor, the digital-to-analog converter 210, the analog-to-digital converter 226, the amplifier 214, a receiver amplifier 370, a switch 368, and a transmit/receive antenna 366. The application specific integrated circuit 364 provides the modulation/demodulation and fast Fourier transformer/inverse fast Fourier transformer functions described above with respect to FIG. 3. The switch 368 selects whether the antenna receives a signal and routes the signal to the receiver amplifier 370 or the antenna transmits a signal routed from the amplifier 214. The application specific integrated circuit 364 is coupled to a processor (which may be referred to as a central processing unit or CPU) 382. The CPU 382 provides a communication packet to the application specific integrated circuit 364 and receives communication packets from the application specific integrated circuit 364, for example data link layer packets.

The processor 382 is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the lager memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A device for communication, comprising:
    a modulator configured to encode an orthogonal frequency division multiplex symbol; and
    an antenna configured to transmit the encoded orthogonal frequency division multiplex symbol;
        wherein the modulator encodes the orthogonal frequency division multiplex symbol by copying a first subset of a plurality of data tones thus creating a first set of copied tones, the first set of copied tones adjacent a first end of the orthogonal frequency division multiplex symbol;
        copying a second subset of the plurality of data tones thus creating a second set of copied tones, the second set of copied tones adjacent a second end of the orthogonal frequency division multiplex symbol; and
        providing the plurality of data tones between the first and second sets of copied tones in the orthogonal frequency division multiplex symbol.

2. The device of claim 1, wherein there are one hundred data tones, five copied tones in the first set of copied tones, and five copied tones in the second set of copied tones.

3. The device of claim 1, wherein the orthogonal frequency division multiplex symbol is further defined to include:
    five null tones, three of the null tones provided at the first end of the orthogonal frequency division multiplex symbol adjacent the first set of copied tones and two of the null tones provided at the second end of the orthogonal frequency division multiplex symbol adjacent the second set of copied tones;
    a direct current tone located at substantially a center of the orthogonal frequency division multiplex symbol; and
    twelve pilot tones interspersed among the plurality of data tones.

4. The device of claim 1, wherein the transmitter transmits the orthogonal frequency division multiplex symbol according to a Multi-band Orthogonal Frequency Division Multiplex Special Interest Group Physical Layer specification.

5. The device of claim 1, wherein each of the copied tones of the first and second sets of copied tones are related to at least one data tone on which the copied tone is based by a constant of proportionality, and wherein each of the constants of proportionality is equal to or greater than zero.

6. The device of claim 1, wherein the first set of copied tones are further defined as a first set of guard tones adjacent the first end of the orthogonal frequency division multiplex symbol and wherein the second set of copied tones are further defined as a second set of guard tones adjacent the second end of the orthogonal frequency division multiplex symbol and wherein the first and second sets of guard tones include copies of at least some of the plurality of data tones.

7. The device of claim 1, wherein the transmitter transmits the orthogonal frequency division multiplex symbol as part of a packet, the packet including a preamble field, a header field, and a data field, the preamble including a channel estimation sequence, the channel estimation sequence using a power envelope identical to a power envelope defined for the orthogonal frequency division multiplex symbol.

8. The device of claim 7, wherein the preamble further includes a packet and frame detection sequence, the packet and frame detection sequence using a power envelope identical to the power envelope defined for the orthogonal frequency division multiplex symbol.

9. A device for wireless orthogonal frequency division multiplex symbol communication, comprising:
    a modulator configured to encode data as an orthogonal frequency division multiplex symbol;
    an antenna configured to send and receive the orthogonal frequency division multiplex symbol; and
    a demodulator configured to decode the orthogonal frequency division multiplex symbol into a stream of data;
        wherein the modulator encodes by making at least some data tones of the orthogonal frequency division multiplex symbol onto guard tones of the orthogonal frequency division multiplex symbol, the guard tones provided on adjacent ends of the data tones of the orthogonal frequency division multiplex symbol, and wherein the guard tones are further defined as a first set of five guard tones on a first end of the orthogonal frequency division multiplex symbol, and a second set of five guard tones on a second end of the orthogonal frequency division multiplex symbol, and wherein copies of ten data tones are provided to the guard tones of the first and second sets of guard tones.

10. The device of claim 9, wherein copies of five data tones adjacent the first end of the orthogonal frequency division multiplex symbol and five data tones adjacent the second end of the orthogonal frequency division multiplex symbol are provided to the guard tones of the first and second sets of guard tones.

11. The device of claim 9, wherein the wireless communication device communicates in accordance with a Multi-band Orthogonal Frequency Division Multiplex Special Interest Group Physical Layer specification.

12. The device of claim 9, wherein each mapping of a selected data tone to a selected guard tone is obtained by multiplying the selected data tone by a constant of proportionality to determine the mapped guard tone, and wherein the constant of proportionality is equal to or greater than zero.

13. A method of wireless communication, comprising:
generating an orthogonal frequency division multiplex symbol having a first set of guard bins adjacent a first end of the orthogonal frequency division multiplex symbol, a second set of guard bins adjacent a second end of the orthogonal frequency division multiplex symbol, and a plurality of data bins for maintaining data provided between the first and second sets of guard bins;
duplicating data such that the first and second sets of guard bins maintain copies of at least some of the same data provided in the plurality of data bins;
wirelessly transmitting the orthogonal frequency division multiplex symbol;
wirelessly receiving the orthogonal frequency division multiplex symbol;
extracting the data tones and the duplicated tones from the orthogonal frequency division multiplex symbol; and
using the duplicated tones to interpret the duplicated data.

14. The method of claim 13, wherein using the duplicated tones to interpret the duplicated data comprises combining the duplicated tones with at least some of the data tones using one method selected from the group consisting of: an equal gain combining technique; and a maximal ratio combining technique.

15. The method of claim 13, further including;
encoding five null tones, two of the five null tones located at the first end of the orthogonal frequency division multiplex symbol and three of the five null tones located at the second end the orthogonal frequency division multiplex symbol;
encoding a direct current tone located in the center of the orthogonal frequency division multiplex symbol; and
encoding twelve pilot tones interspersed with the data tones.

16. The method of claim 13, wherein the wirelessly transmitting and receiving are performed in accordance with a Multi-band Orthogonal Frequency Division Multiplex Special Interest Group Physical Layer specification.

17. The method of claim 13, wherein the duplicated data is based on data in one of the plurality of data bins by multiplying the data bin data by a constant of proportionality to determine a mapped tone, and wherein the constant of proportionality is equal to or greater than zero.

18. The method of claim 17, wherein the data is duplicated before the data is provided to the data bins and guard bins.

* * * * *